United States Patent [19]
Oguma et al.

[11] Patent Number: 5,132,971
[45] Date of Patent: Jul. 21, 1992

[54] IN-CIRCUIT EMULATOR

[75] Inventors: Yasuyuki Oguma; Yoshifumi Imazu, both of Atsugi; Masahiro Shouda, Tokyo, all of Japan

[73] Assignees: Anritsu Corporation; NEC Corporation, both of Tokyo, Japan

[21] Appl. No.: 151,886

[22] Filed: Feb. 3, 1988

[30] Foreign Application Priority Data

Feb. 6, 1987 [JP] Japan .................. 62-27016
Feb. 6, 1987 [JP] Japan .................. 62-27017

[51] Int. Cl.$^5$ .............................. G06F 11/30
[52] U.S. Cl. .................. 371/16.2; 371/68.3
[58] Field of Search ............ 371/15, 16, 19, 20, 371/68.3

[56] References Cited

U.S. PATENT DOCUMENTS

| | | | |
|---|---|---|---|
| 4,635,193 | 1/1987 | Moyer et al. | 371/16 |
| 4,636,940 | 1/1987 | Goodwin, Jr. | 364/200 |
| 4,674,089 | 6/1987 | Poret et al. | 371/16 |

FOREIGN PATENT DOCUMENTS 60-146341 8/1985 Japan.

OTHER PUBLICATIONS

Parks, R. et al., "Emulator Solves System-Level Debug Problems", Electronic Design, vol. 29, No. 10, May 14, 1981, pp. 173-189.
Falk, H., "Emulators Keep Pace with Chip Speeds and Complexity", Computer Design, May 15, 1987, pp. 31-38.
Donnelly, J., et al., "Emulators for Microprocessor System Development", Hewlett-Packard Journal, Oct. 1980, pp. 13-20.
Ching, C., "Solutions to NS16000 Family Microprocessor Emulation Design Challenges", Wescon/83 Conference Record, pp. 29.1.1-14.
Ciminiera, L. et al., Advanced Microprocessor Architectures, Addison-Wesley, 1987, pp. 283-292, 313-321.
Grappel, R., "Extend $\mu$P Capabilities with a Memory Management IC", EDN, Feb. 3, 1983, pp. 123-130.
Hewlett-Packard Journal, Oct. 1980; "Emulators for Microprocessor System Development", pp. 13-20.

Primary Examiner—Stephen M. Baker
Attorney, Agent, or Firm—Frishauf, Holtz, Goodman & Woodward

[57] ABSTRACT

An in-circuit emulator is inserted in a CPU socket of a target system that uses a program designed to use virtual addresses. The in-circuit emulator includes a first emulation processor for emulating execution of the program of the target system, a second emulation processor having the same arrangement as that of the first emulation processor, for outputting a virtual address corresponding to a physical address output from the first emulation processor, and a means for outputting a break request signal when a virtual address at a desired breakpoint in the program and the output virtual address do not coincide with each other.

13 Claims, 3 Drawing Sheets

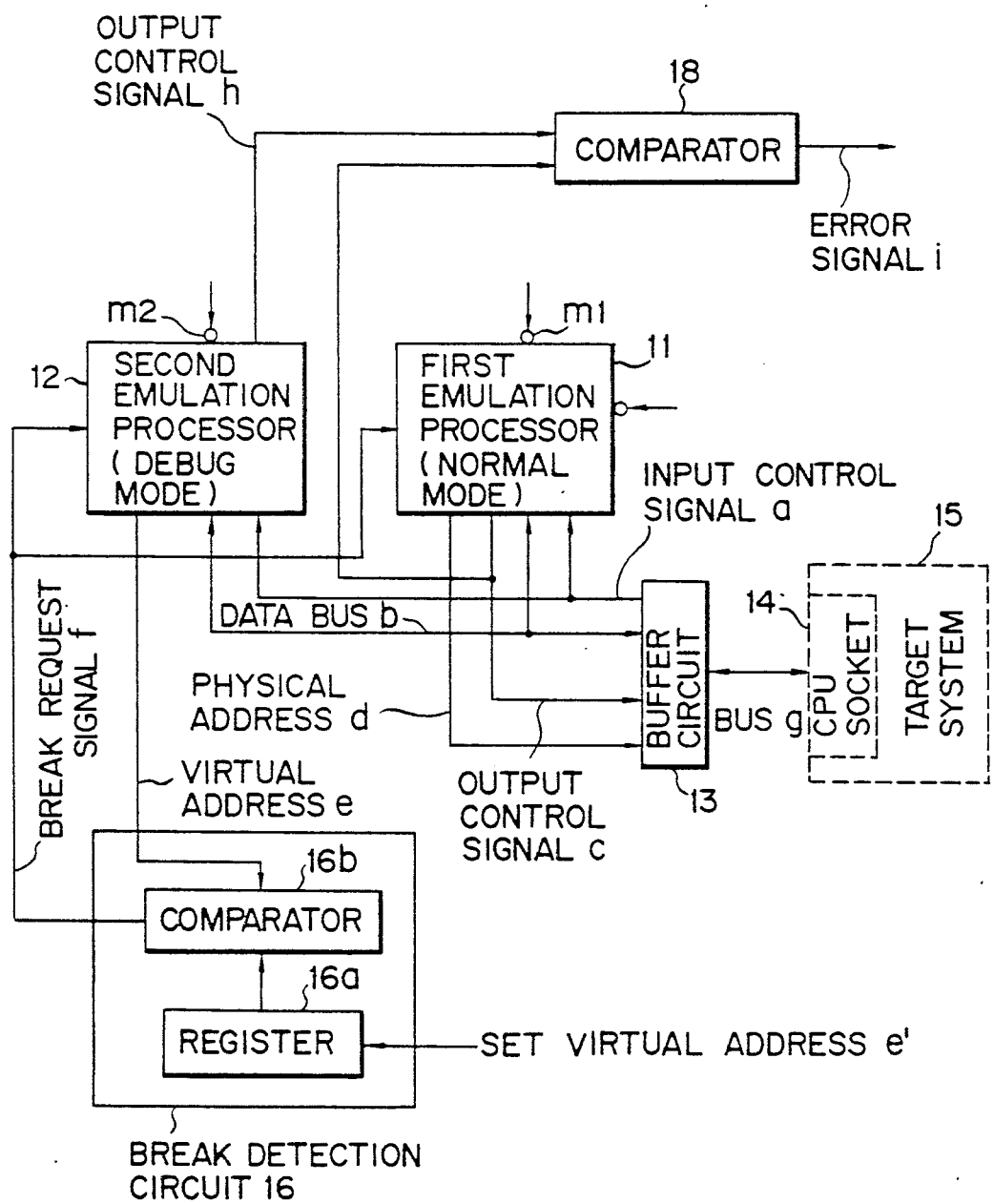
F I G. 3

IN-CIRCUIT EMULATOR

BACKGROUND OF THE INVENTION

1. Field of the Invention

The present invention relates to an in-circuit emulator used in a microprocessor incorporating a memory management unit (MMU).

2. Description of the Related Art Including Information Disclosed Under § 1.97-1.99.

In computer technology, to execute a large program using a small-capacity memory without lowering the program operation speed, and to improve the use efficiency of the memory, the virtual storage technique is employed. When a CPU executes a program, addresses in the main memory are not accessed by the CPU at random; only specific addresses are accessed when considered within a certain period during execution of the program. The virtual storage technique utilizes this fact. In this technique, the entire program to be executed is stored in a submemory such as a hard disk and only the necessary part is loaded in the main memory, thereby executing the program. Accordingly, a large program can be executed using a small-capacity memory or simultaneous execution (multitasking) of a plurality of programs can be efficiently performed.

More specifically, a program is divided into a plurality of blocks each having a predetermined size. During execution of a program consisting of a plurality of blocks, currently-required blocks are loaded in the main memory and unnecessary blocks are left in the submemory. When a block that is not loaded in the main memory is to be executed as the execution of the program progresses, the CPU temporarily interrupts the execution of the program and transfers control to an OS (operating system). In this case, the OS searches for a block in the main memory that has not been repeatedly accessed, e.g. the least-recently used block. The OS then re-stores this unnecessary block in the sub-memory or discards it, thereby leaving a free area created in the main memory. Subsequently, the OS transfers and loads the block to be executed from the sub-memory into the free area created in the main memory and restarts the execution of the interrupted program. As described above, in practice, a program is executed using a small-capacity main memory, but the system operates as if an entire program were stored in a virtual large-capacity main memory. Therefore, storage in this virtual main memory is termed virtual storage.

To realize this virtual storage technique, a circuit is required to translate an address (a virtual address) in a virtual memory into an address (physical address) in a main memory at which part of a corresponding program is stored. This circuit is called a memory management unit (MMU). The MMU refers to a translation table that stores physical addresses determined by the OS when the OS loads desired blocks of a program in a main memory, and translates a virtual address into a physical address. The MMU includes a TLB (Translation Look-aside Buffer) for storing several pieces of translated information. The contents of the TLB are constantly updated by information translated by referring to the translation table. The MMU does not always refer to the translation table to perform translation. When translation can be performed by referring to the TLB, translation is performed directly. The translation table is referred only when translation information is not present in the TLB, thereby decreasing the number of accesses to the memory.

More specifically, the virtual address is the one prior to translation by the MMU, and the physical address is the one after translation. A normal program is designed to be operated by this virtual address.

A conventional MMU of this type has previously been produced as an LSI which is independent of a microprocessor chip. Recently, however, a VLSI microprocessor chip, such as the 80386 available from Intel Corporation and the V60 available from NEC Corporation, has been produced which incorporates an MMU to increase the speed of translation from a virtual address into a physical address. Therefore, in a microprocessor chip incorporating the memory MMU, a virtual address is translated into a physical address in the microprocessor chip, and only the physical address is output from the microprocessor chip.

An in-circuit emulator is a kind of development tool for software and hardware that is used for efficiently developing a system (to be referred to as a target system hereinafter) to which a microprocessor is applied. It is used especially for debugging programs contained in a target system.

A target system is constituted by a microprocessor, a memory for storing programs and data, and an I/O port for controlling the system. The microprocessor of a target system under development is not directly fixed to the system, but is detachably mounted using a socket on a printed circuit board or something similar.

When a program contained in a target system is to be debugged using an in-circuit emulator, the microprocessor of the target system is unplugged from the target system socket, and the plug of the in-circuit emulator is connected to the socket instead. A microprocessor equivalent to the one mounted on the target system is incorporated in the in-circuit emulator and is used to debug the program. Debugging is performed by the microprocessor incorporated in the in-circuit emulator. Thus, this microprocessor is called an emulation microprocessor or an emulation processor. That is, the emulation processor executes the program of the target system in place of the microprocessor to be incorporated in the target system. In addition, an in-circuit emulator has a break function for breaking execution of the program at an arbitrary point designated by a user so as to allow debugging of the program, a start continue function for restarting the execution, a trace function for storing and displaying an execution process of the program, a function for referring or modifying the contents of a memory and register, an emulation memory for emulating the memory function of the target system, and the like. The user debugs the program of the target system using these functions.

The most important function in an in-circuit emulator is the break function. Bugs in the program cause erroneous operation of the target system. It is difficult for the user to find a bug in the program when an erroneous operation actually occurs. The user notices an unexpected output in the final result and realizes that a bug is present somewhere in the program. In this case, when debugging is to be performed, execution of the program is interrupted at an arbitrary point, and the contents of a register or memory are repeatedly checked until the bug is found. In general, therefore, the break function uses an address to designate a break location in the program or data, thereby breaking the execution when the CPU accesses the designated address.

FIG. 1 is a block diagram of a conventional in-circuit emulator. The conventional in-circuit emulator is described in detail below with reference to FIG. 1.

Emulation processor 7 is a microprocessor to be used in target system 5. Control signal J, data b, and physical address d are supplied from emulation processor 7 to CPU socket 4 of target system 5, to which a microprocessor of system 5 ought to be connected, through bus g. Break detection circuit 6 receives physical address d from emulation processor 7 and outputs break request signal f. Break request signal f is supplied to emulation processor 7.

In an in-circuit emulator arranged in this manner, a program is executed such that emulation processor 7 accesses target system 5, to which emulation processor 7 is connected through buffer circuit 3 and CPU socket 4. When physical address d, which is constantly monitored by break detection circuit 6, becomes a predetermined value during execution of the program, break request signal f is output and causes emulation processor 7 to stop the execution.

However, the following problems are posed in such an in-circuit emulator.

(1) It does not allow debugging of a program which is designed for a microprocessor incorporating an MMU by utilizing virtual addresses. This is because an address output from the emulation processor is a physical address after translation by the MMU incorporated in the emulation processor. Therefore, a breakpoint cannot be set by a virtual address.

(2) When an error occurs during execution of the program because of a malfunction of the emulation processor, it is difficult to immediately determine whether the error has been caused by an erroneous operation of the emulation processor or by a bug in the program.

SUMMARY OF THE INVENTION

It is the object of the present invention to solve these problems by providing an in-circuit emulator in which two emulation processors are used in place of a conventional single emulation processor. These two emulation processors operate simultaneously and in parallel. The physical address is output from one emulation processor, and the virtual address is output from the other emulation processor at the same timing as that of the physical address. The virtual address is compared with a predetermined breakpoint virtual address value to perform a break using the virtual address. A comparator, which is arranged to constantly compare the control signals output from the two emulation processors, outputs an error signal when the control signals differ from each other, thereby informing the user of an erroneous operation of the emulation processors.

Each of the two emulation processors is a conventional processor with separate modes for either outputting physical or virtual addresses. These modes can be externally switched. One of the two emulation processors is set to the normal mode (for outputting a physical address), the other one is set to the debug mode (for outputting a virtual address), and the two emulation processors are operated simultaneously and in parallel. The microprocessor set to the debug mode is operated so as to output a virtual address corresponding to a physical address output from the microprocessor set to the normal mode.

BRIEF DESCRIPTION OF THE DRAWINGS

FIG. 3 is a block diagram of another embodiment according to the present invention.

DETAILED DESCRIPTION OF THE PREFERRED EMBODIMENTS

Figure 1:
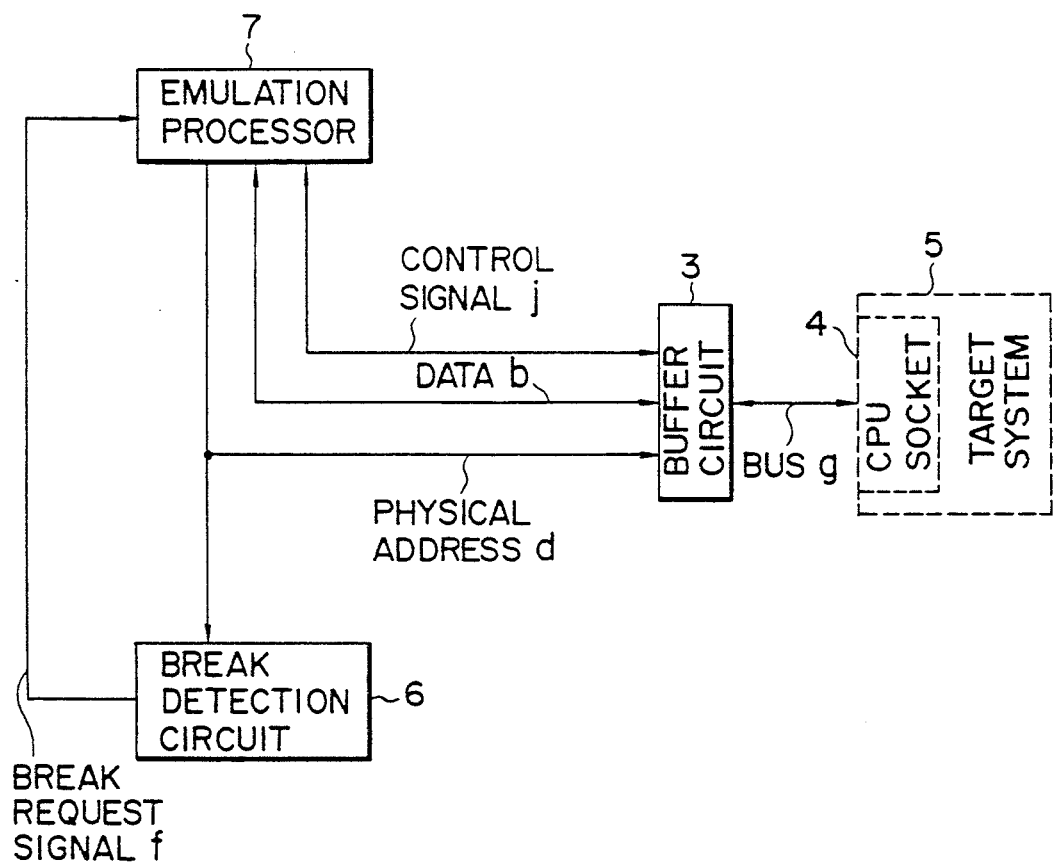
FIG. 1 is a block diagram of a conventional in-circuit emulator.
Figure 2:
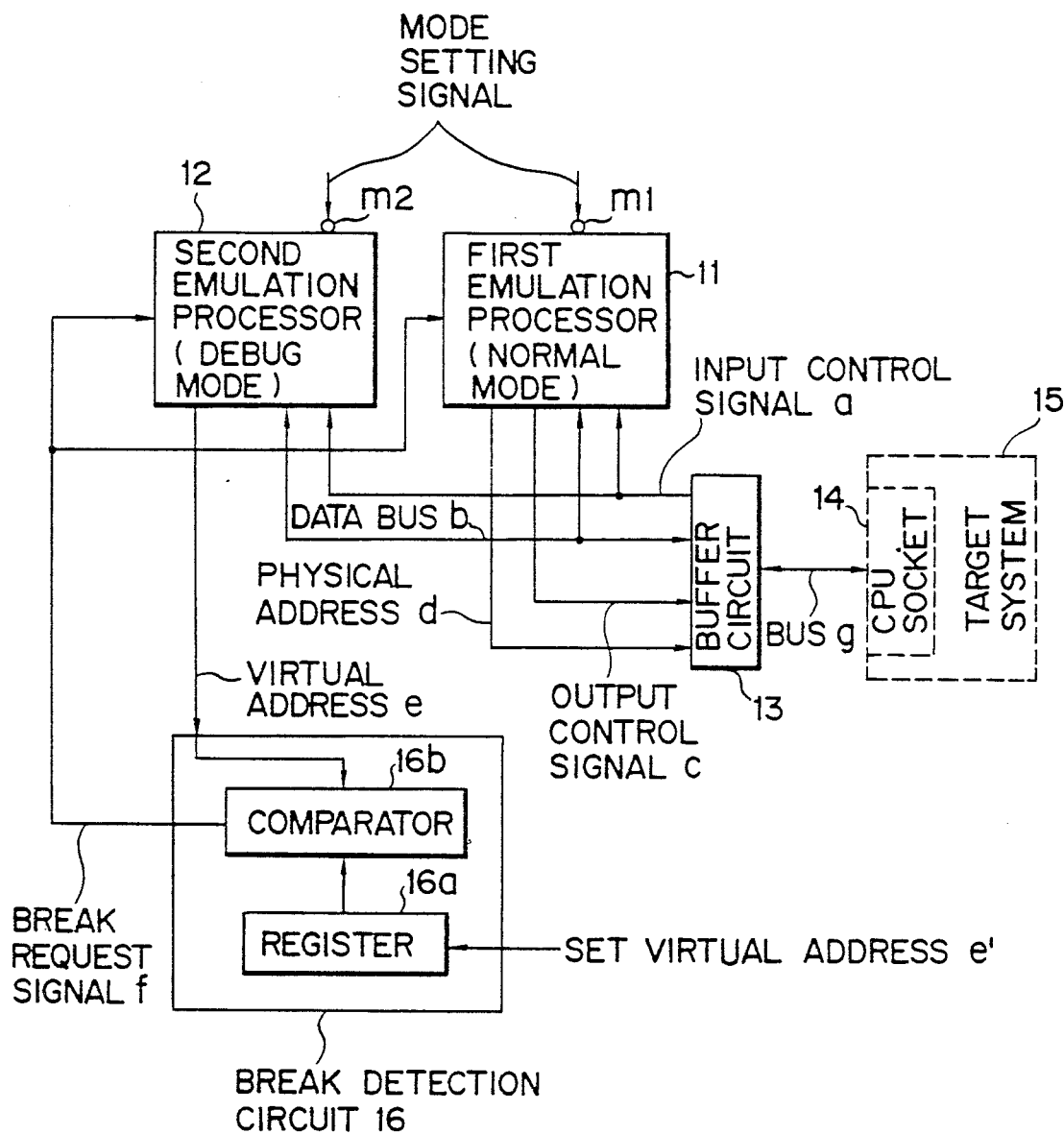
FIG. 2 is a block diagram of an in-circuit emulator according to an embodiment of the present invention.

FIG. 2 is a block diagram of an embodiment according to the present invention. The embodiment of the present invention is described in detail below with reference to FIG. 2.

Referring to FIG. 2, first emulation processor 11 is set in the normal mode. First emulation processor 11 is a microprocessor equivalent to the one to be inserted in CPU socket 14 of target system 15, and outputs physical address d. Second emulation processor 12 is the same microprocessor as first emulation processor 11 but is set in the debug mode. Second emulation processor 12 directly outputs virtual address e at the same timing as that of the physical address d by bypassing the MMU in the microprocessor.

The method of setting microprocessors 11 and 12 in the normal or debug mode depends on the microprocessor to be used. In the method used in this case, specified logic signals are supplied to mode setting terminals m1 and m2. In other methods, specified instructions or control signals with specific patterns are supplied. In this in-circuit emulator, the mode is set in accordance with the mode setting method designated by the microprocessor of target system 15.

Signal lines of input control signal a, output control signal c, data bus b, and physical address d of first emulation processor 11 are connected to CPU socket 14 of target system 15 through buffer circuit 13 and bus g. Signal lines of the input control signal and data of second emulation processor 12 are respectively connected to the signal lines of input control signal a and data bus b of first emulation processor 11. Virtual address e output from second emulation processor 12 is supplied to break detection circuit 16. Break detection circuit 16 monitors virtual address e from second emulation processor 12 and outputs break request signal f. Break request signal f is supplied to first and second emulation processors 11 and 12. Break detection circuit 16 refers to a program list of target system 15. Break detection circuit 16 comprises register 16a for receiving virtual address e', which designates a breakpoint set by the operator, and comparator 16b, one side of which receives virtual address e from second emulation processor 12. The virtual addresses e and the set virtual address e' are compared with each other. When they are the same, break request signal f is output from comparator 16b to first and second emulation processors 11 and 12.

An operation of the in-circuit emulator arranged in this manner is described below. The states of first and second emulation processors 11 and 12 are described using Table 1 for the case when first emulation processor 11 is set in the normal mode and accesses target system 15 while the second emulation processor 12 is operated concurrently. First emulation processor 11 accesses target system 15 using a physical address. When data is to be read, target system 15 outputs the data onto data bus b and first emulation processor 11 receives the data. When data is to be written, first emulation processor 11 outputs the data onto data bus b and writes it in a memory or an I/O port in target system 15. Meanwhile, second emulation processor 12 accesses the virtual address corresponding to the physical address. When data is to be read, second emulation processor 12 reads the same data as first emulation processor 11 because data bus b is also connected to both the first and second emulation processor 11 and 12. When data is to be written, because second emulation processor 12 is set in the debug mode it operates so as to cut off data bus b and hence the data is not output to data bus b.

TABLE 1

|  | Data read mode | Data write mode | Address accessed |
| --- | --- | --- | --- |
| First emulation processor (in normal mode) | Data bus connected to system Data read from target system. | constantly target Data written in large system. | Physical address |
| Second emulation processor (in debug mode) | Data bus connected to first and second emulation processor | Second emulation processor cuts off data bus | Virtual address |
| Second emulation processor Reads | Same data as emulation processor. The same data as first emulation processor. | Data not output to data bus processor. Data not output to data bus. |  |

That is, first emulation processor 11 accesses target system 15 through buffer circuit 13 and executes the program of target system 15. Second emulation processor 12 executes the same program of target system 15 simultaneously with first emulation processor 11, and outputs virtual address e corresponding to physical address d output from first emulation processor 11.

Table 2 shows the correspondence between the physical address, virtual address, and instruction represented as hexadecimal and mnemonic codes. In this example, the virtual and physical addresses have 12 identical lower bits; the upper bits thereof are translated by the MMU from the virtual addresses into the physical addresses.

TABLE 2

| Physical address | Virtual address | Instruction |
| --- | --- | --- |
| 2FFE | 11FFE | MOV R0, R1 |
| 2FFF | 11FFF | MOV R1, R6 |
| 1000 | 12000 | CMP R0, R10 |
| 1001 | 12001 | JNE #10000 |
| 5000 | 10000 | NOP |
| . | . | . |
| . | . | . |
| . | . | . |
| 5100 | 10100 | NOP |

More specifically, when the upper two bits of the virtual addresses and the most significant bits of the physical addresses are considered, 11, 12, and 10 translate into 2, 1, and 5, respectively. Furthermore, as shown in Table 2, the virtual addresses in the 2nd and 3rd rows are continuous, but the physical addresses in the same rows are discontinuous. Therefore, a virtual address cannot be inferred from a physical address. In addition, virtual addresses are uniquely determined upon formation of a program. However, physical addresses are determined when the program blocks are loaded by the OS into the main memory. For this reason, a physical address is not always constant; its value may change every time a given block is reloaded in the main memory.

Break detection circuit 16 outputs break request signal f when virtual address e becomes the value e' set as the breakpoint, thereby causing first and second emulation processors 11 and 12 to stop program execution.

According to the embodiment, even if a block which is not loaded in the main memory, i.e., a virtual address whose physical address is not determined, is set as the breakpoint, the program can be broken when the block is loaded and executed. Therefore, it is extremely effective from the practical viewpoint.

FIG. 3 shows another embodiment, which is designed to cope with the case when an error occurs between operation of first and second emulation processors 11 and 12. The embodiment in FIG. 3 is different from that in FIG. 2 only in that comparator 18 has been added. The same reference numerals used in FIG. 2 are used in FIG. 3 to denote the same parts. Referring to FIG. 3, the two inputs to comparator 18 are separately connected to the output control signal output of the first and second emulation processors 11 and 12. Comparator 18 compares output control signals c and h from first and second emulation processors 11 and 12, as first and second input signals, respectively. When the logical values of output control signals c and h are different from each other, comparator 18 outputs error signal i. Note that operation of the two processors 11 and 12 could be checked by comparing other signals representing their operations instead of comparing the output control signals of the respective processors.

As shown in FIG. 3, when an error occurs between the operations of two processors 11 and 12, error signal i is output from comparator 18, thereby informing the user that one of the emulation processors has operated erroneously. An error occurs between the operations of first and second emulation processors 11 and 12 when input control signal a or data b input to both emulation processors 11 and 12 is recognized erroneously or when one of emulation processors 11 and 12 is out of order. It is apparent from the basic operation of the microprocessors that output control signals c and h are also different from each other.

Thus, the difference between the embodiments in FIGS. 2 and 3 is that comparator 18 is not used in the embodiment shown in FIG. 2. More specifically, when the operation of the two emulation processors separated set to the normal and debug modes need not be compared with each other and only a break function using virtual addresses is required, the in-circuit emulator embodiment in FIG. 2 operates satisfactorily.

In addition, the in-circuit emulator according to the present invention can be combined with a tracer serving as an additional function of the in-circuit emulator, i.e., a function for displaying the progress of an executed program. In this case, by designating a virtual address, a trace start point can easily be designated. Also, by tracing the virtual address itself, a trace result can easily be displayed by means of virtual addresses.

As has been described above, according to the embodiments of the present invention, (1) since a breakpoint can be set using a virtual address, a program designed to use virtual addresses can be debugged, and (2) even if an erroneous operation occurs in an emulation processor, it can be immediately determined whether it is caused by a bug in the program or by a malfunction in an emulation processor because the erroneous operation can be recognized by an error signal.

What is claimed is:

1. An in-circuit emulator used upon being connected to a target system to which a microprocessor having a memory management unit ("MMU") is to be connected through a bus, comprising;
    a first emulation processor means including a first CPU and a first MMU, and operated in a normal mode in which only physical address information is available, for emulating execution of a given program for operating said target system and for outputting a physical address from said first MMU via a first address bus;
    said bus connected to said target system including a buffer circuit means coupled to said first address bus, and signal lines of an input control signal, an output control signal and data being coupled to said buffer circuit means;
    a second emulation processor means including at least a second CPU, and operated in a debug mode in which only virtual address information is available, for receiving the input control signal and the data and for executing said given program for operating said target system simultaneously with said first emulation processor means, and for outputting via a second address bus a virtual address corresponding to the physical address output from said first emulation processor means; and
    a break detection means for receiving a preset virtual address corresponding to a desired break-point, and for receiving the virtual address via said second address bus, and including means for outputting a break request signal to both said first and second emulation processor means when said virtual address received via said second address bus corresponds to said preset virtual address.

2. An in-circuit emulator according to claim 1, wherein each of said first and second emulation processor means has the same arrangement as that of a microprocessor to be normally inserted in a CPU socket of said target system.

3. An in-circuit emulator according to claim 1, wherein said break detection means comprises:
    comparator means, having a first input terminal and a second input terminal for receiving, at said second input terminal, the virtual address output from said second emulation processor means,
    register means for storing a set value of a virtual address at which a break is required, and
    means for supplying the set value stored in said register means to said first input terminal of the comparator means, and when a coincidence signal occurs between the set value and the virtual address supplied to said first and second input terminals, respectively, said comparator means generates an output signal as the break request signal.

4. An in-circuit emulator according to claim 1, wherein said first emulation processor means comprises signal lines of input control signals and a data bus which are connected with signal lines of said second emulation processor means, respectively.

5. An in-circuit emulator according to claim 4, wherein said first and second emulation processor means include mode setting terminals for receiving specified logic signals for setting said first and second emulation processor means in the normal and debug modes, respectively.

6. An in-circuit emulator according to claim 1, further comprising means for supplying a debug mode setting signal for setting said second emulation processor means to the debug mode.

7. An in-circuit emulator according to claim 6, further comprising means for supplying a normal mode setting signal for setting said first emulation processor means to the normal mode.

8. An in-circuit emulator used upon being connected to a target system to which a microprocessor having a memory management unit ("MMU") is to be connected through a bus, comprising:
    a first emulation processor means including a first CPU and a first MMU, and operated in a normal mode, for emulating execution of a given program for operating said target system and for outputting a physical address via a first address bus;
    said bus connected to said target system including a buffer circuit means coupled to said first address bus, and signal lines of an input control signal, an output control signal and data being coupled to said buffer circuit means;
    a second emulation processor means, operated in a debug mode, for receiving the input control signal and the data and for executing said given program for operating said target system simultaneously with said first emulation processor means, and for outputting via a second address bus the virtual address corresponding to the physical address output from said first emulation processor means;
    break detection means for receiving the virtual address via said second address bus and for outputting a break request signal to said first and second emulation processor means; and
    comparator means for receiving a first predetermined output signal from said first emulation processor means as a first input, and a second predetermined output signal from said second emulation processor means, which corresponds to the first predetermined output signal, as a second input, and for outputting an error signal indicating an error condition when both of the first and second output signals do not coincide with each other.

9. An in-circuit emulator according to claim 9, wherein the first and second predetermined output signals are output control signals from said first and second emulation processor means respectively.

10. An in-circuit emulator according to claim 8, wherein said first emulation processor means comprises signal lines of input control signals and a data bus which are connected with signal lines of said second emulation processor means, respectively.

11. An in-circuit emulator according to claim 10, wherein said first and second emulation processor means include mode setting terminals for receiving specified logic signals for setting said first and second emulation processor means in the normal and debug modes, respectively.

12. An in-circuit emulator according to claim 8, further comprising means for supplying a debug mode setting signal for setting said second emulation processor means to the debug mode.

13. An in-circuit emulator according to claim 12, further comprising means for supplying a normal mode setting signal for setting said first emulation processor means to the normal mode.

* * * * *